(12) United States Patent
Li et al.

(10) Patent No.: US 11,973,422 B2
(45) Date of Patent: Apr. 30, 2024

(54) HIGH STEP-DOWN MODULAR DC POWER SUPPLY

(71) Applicant: Zhejiang University, Hangzhou (CN)

(72) Inventors: Wuhua Li, Hangzhou (CN); Chushan Li, Hangzhou (CN); Lin Zhu, Hangzhou (CN); Huan Yang, Hangzhou (CN); Shengdao Ren, Hangzhou (CN); Huiqiang Yan, Hangzhou (CN); Jing Sheng, Hangzhou (CN); Xiangning He, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 226 days.

(21) Appl. No.: 17/642,770

(22) PCT Filed: May 20, 2021

(86) PCT No.: PCT/CN2021/094885
§ 371 (c)(1),
(2) Date: Mar. 14, 2022

(87) PCT Pub. No.: WO2021/258935
PCT Pub. Date: Dec. 30, 2021

(65) Prior Publication Data
US 2022/0337157 A1 Oct. 20, 2022

(30) Foreign Application Priority Data
Jun. 22, 2020 (CN) .......................... 202010576368.8

(51) Int. Cl.
*H02M 3/156* (2006.01)
(52) U.S. Cl.
CPC ................................. *H02M 3/156* (2013.01)

(58) Field of Classification Search
CPC .... H02M 3/1582; H02M 3/156; H02M 3/157; H02M 3/1584; H02M 3/1586;
(Continued)

(56) References Cited

U.S. PATENT DOCUMENTS

| 9,401,663 B2 * | 7/2016 | Deboy | ....................... H02J 3/40 |
| 11,228,257 B2 * | 1/2022 | Munk-Nielsen | ........................... H02M 3/33584 |
| 2022/0352394 A1 * | 11/2022 | Ledenev | ........... H01L 31/02021 |

FOREIGN PATENT DOCUMENTS

| CN | 107453603 A | 12/2017 |
| CN | 108847777 A | 11/2018 |

(Continued)

*Primary Examiner* — Jeffrey A Gblende
(74) *Attorney, Agent, or Firm* — Muncy, Geissler, Olds & Lowe, P.C.

(57) ABSTRACT

The present invention discloses a high step-down modular DC power supply, belonging to the field of power electronics technology, and the high step-down modular DC power supply includes an upper modular cascade circuit string, a lower modular cascade circuit string, a load, and an input source, where the upper modular cascade circuit string includes i upper sub-module circuits, and the lower modular cascade circuit string includes j lower sub-module circuits. A combination manner of module circuits includes: upper module string cascading, lower module string cascading, and hybrid cascading of the upper module string and the lower module string. The power supply is formed to be a high voltage step-down ratio power supply with high voltage direct current input and low voltage direct current output through modular cascading. No synchronous control signal is needed between sub-modules of the power supply, voltage equalization of power supply input series capacitors may be realized without a central controller, and therefore, a control strategy of each sub-module is very simple. The power supply may be flexibly expanded in voltage and power (Continued)

classes, and is suitable for auxiliary power supply applications in medium voltage or high voltage DC input occasions.

4 Claims, 7 Drawing Sheets

(58) Field of Classification Search
CPC .... H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38
See application file for complete search history.

(56) References Cited

FOREIGN PATENT DOCUMENTS

| | | | |
|---|---|---|---|
| CN | 109361316 | A | 2/2019 |
| CN | 109617433 | A | 4/2019 |
| CN | 110504840 | A | 11/2019 |
| CN | 111740597 | A | 10/2020 |
| EP | 2408096 | A1 | 1/2012 |

* cited by examiner

HIGH STEP-DOWN MODULAR DC POWER SUPPLY

TECHNICAL FIELD

The present invention relates to a high step-down modular power supply, and in particular, to a high step-down modular direct current (DC) power supply and a control method thereof, belonging to the field of power electronics technology.

BACKGROUND

For power electronics equipment, medium-voltage high-power conversion equipment usually refers to the equipment working at a voltage of 1 kV-35 kV. Different from a medium-voltage alternating current (AC) system, in a medium-voltage DC system, low-voltage electrical equipment that needs to directly take power from a medium-voltage DC side cannot directly use a step-down transformer commonly used in an AC occasion, but can only use a power electronic circuit for chopping on a medium-voltage side. The low-voltage electrical equipment inverts medium-voltage DC into high-frequency AC, and then uses a high-frequency transformer for isolation, transformation, and rectification to generate a stable low-voltage DC power supply. However, the highest voltage class of the existing commercial power semiconductor devices is only 6500V, which cannot be directly applied to a medium-voltage DC system of about 10 kV. Therefore, for a power electronic converter on the medium-voltage side, a semiconductor device series technology or a modular power supply cascade technology must be used.

A medium-voltage converter with a direct series technology of semiconductor devices are commonly used in the field of medium-voltage electrical drive, and power classes of converters are all megawatts. In this solution, an on-off action of each semiconductor device must be strictly consistent, technical requirements for isolation transmission of switching signals and controller delay compensation are extremely high, not suitable for low-power, cost-sensitive switching power supply occasions.

For high input DC voltage occasions, a common application mode is to form an input stage with high input voltage by connecting modules with low input voltage in series on a high voltage side, and to form an output stage with low output voltage in parallel on an output side, namely, an input-series output-parallel (Input-series output-parallel, ISOP) DC converter system. A key problem of the input-series output-parallel DC converter system is to ensure input voltage-sharing and output current-sharing of each module in the system. In order to achieve this purpose, a unified central controller must be used to keep switching signals between converters synchronous, and a low-voltage output DC voltage is kept stable through a corresponding closed-loop control strategy. For example, an input voltage-sharing control strategy of master-slave control is proposed in the prior art, which needs to designate a module connected to a negative bus of an input voltage of the system as a master module, and all other modules as slave modules, and the master module adopts output voltage feedback control to ensure a stable output voltage of the system. In order to realize master-slave control, a master converter module needs to establish communication with a slave controller, or share voltage information through other methods. This type of solution is relatively complex to implement in a medium-voltage system, and needs to consider various technologies such as high-voltage isolation and information coding, and is not suitable for some occasions sensitive to cost requirements.

In the existing literature, there are occasionally modular power supply combinations that do not require a voltage-sharing controller, such as same duty cycle control and non-interconnection cable control. A main circuit of each module of the same duty cycle control is exactly the same as a power circuit, realizing circuit modularization, but there is a control interconnection cable between modules. When the interconnection cable is disturbed or faulty, reliable operation of the system may be affected. The non-interconnection cable control avoids interconnection of the control and realizes modularization of the design. A control loop of each module may be designed independently, which reduces design difficulty but increases design complexity and is difficult to be used in wide voltage input occasions. For example, in a non-interconnection cable control strategy proposed in the prior art, a linear relationship between the input voltage and the output voltage is used in the ISOP system to inversely control the input voltage to be equally divided by the same output voltage, such that control of each module is relatively independent. However, this method does not work well for staggered parallel or asymmetric situations.

SUMMARY

In view of the foregoing description, in order to solve the problems of limited voltage classes and complex voltage-sharing control strategies in the medium-voltage DC system in the prior art, the present invention proposes a high step-down modular DC power supply and a control method thereof. The power supply is obtained by cascaded combination of sub-module circuits, and a circuit topology of each sub-module is obtained by transforming the most basic Buck-Boost circuit structure. The circuit design modular is realized, and the structure is simple. Moreover, the power supply is obtained by cascading basic sub-module circuit units, and a quantity of cascading stages may be increased correspondingly according to the increase of the class of input voltage, with strong scalability and high flexibility. Moreover, no communication and synchronization is needed between control modules of each sub-module circuit for completely independent control, and input voltage-sharing of each module can be realized to be used in medium-voltage DC occasions. Therefore, the solution is simple to implement and low in cost, suitable for auxiliary power supply applications in medium voltage or high voltage DC input occasions.

The present invention is implemented through the following technical solutions to achieve the foregoing objects:

A high step-down modular DC power supply, where the DC power supply includes an input source, a load, an upper modular cascade circuit string including i upper sub-module circuits, and/or a lower modular cascade circuit string including j lower sub-module circuits;

the upper sub-module circuit includes a first capacitor, a second capacitor, a first inductor, a first switch tube, a first diode, and three upper output ports; and a first upper output port of the upper sub-module circuit, a positive side of the first capacitor, and a drain of the first switch tube are in common connection, a second upper output port of the upper sub-module circuit, a negative side of the first capacitor, a positive side of the second capacitor, and one end of the first inductor are in common connection, a third upper output port of the upper sub-module circuit, a negative side of the second capacitor, and an anode of the first diode are in common connection, and a source of the first switch tube, the other end of the first inductor, and a cathode of the first diode are in common connection;

the lower sub-module circuit includes a third capacitor, a fourth capacitor, a second inductor, a second switch tube, a second diode, and three lower output ports; and a first lower output port of the lower sub-module circuit, a positive side of the third capacitor, and a cathode of the second diode are in common connection, a second lower output port of the lower sub-module circuit, a negative side of the third capacitor, a positive side of the fourth capacitor, and one end of the second inductor are in common connection, a third lower output port of the lower sub-module circuit, a negative side of the fourth capacitor, and a source of the second switch tube are in common connection, and a drain of the second switch tube, the other end of the second inductor, and an anode of the second diode are in common connection;

the upper modular cascade circuit string includes three upper ports, a first upper port is connected to a first upper output port of a first upper sub-module circuit, a second upper port is connected to a second upper output port of an ith upper sub-module circuit, and a third upper port is connected to a third upper output port of the ith upper sub-module circuit; and an internal cascading mode of the i upper sub-module circuits is as follows: a second upper output port of an upper sub-module circuit on a previous stage is connected to a first upper output port of an upper sub-module circuit on an adjacent subsequent stage, and a third upper output port of an upper sub-module circuit on a previous stage is connected to a second upper output port of an upper sub-module circuit on an adjacent subsequent stage, where i is a natural number;

the lower modular cascade circuit string includes three lower ports, a first lower port is connected to a first lower output port of a first lower sub-module circuit, a second lower port is connected to a first lower output port of a second lower sub-module circuit, and a third lower port is connected to a third lower output port of a $j^{th}$ lower sub-module circuit; and an internal cascading mode of the j lower sub-module circuits is as follows: a second lower output port of a lower sub-module circuit on a previous stage is connected to a first lower output port of a lower sub-module circuit on an adjacent subsequent stage, and a third lower output port of a lower sub-module circuit on a previous stage is connected to a second lower output port of a lower sub-module circuit on an adjacent subsequent stage, where j is a natural number;

when $2 \leq i$ and $2 \leq j$, the first upper port of the upper modular cascade circuit string is connected to a positive side of the input source, the third lower port of the lower modular cascade circuit string is connected to a negative side of the input source, the second upper port of the upper modular cascade circuit string and the first lower port of the lower modular cascade circuit string are in common connection with a positive side of the load, and the third upper port of the upper modular cascade circuit string and the second lower port of the lower modular cascade circuit string are in common connection with a negative side of the load;

when $j=0$ and $2 \leq i$, the first upper port of the upper modular cascade circuit string is connected to the positive side of the input source, the second upper port of the upper modular cascade circuit string is connected to the positive side of the load, and the third upper port of the upper modular cascade circuit string and the negative side of the load are in common connection with the negative side of the input source; and when $i=0$ and $2 \leq j$, the third lower port of the lower modular cascade circuit string is connected to the negative side of the input source, the second lower port of the lower modular cascade circuit string is connected to the negative side of the load, and the first lower port of the lower modular cascade circuit string and the positive side of the load are in common connection with the positive side of the input source.

In an embodiment of the present invention, both the upper sub-module circuit and the lower sub-module circuit include a control module for controlling turn-on/turn-off of the switch tube.

In an embodiment of the present invention, $i=j$ and $i \geq 2$, $j \geq 2$.

In an embodiment of the present invention, the switch tube is a full-controlled power semiconductor device.

On the other hand, the present invention further provides a control method of a high step-down modular DC power supply, including: collecting, by a control module, a voltage value of a first capacitor and a voltage value of a second capacitor in each upper sub-module circuit and/or lower sub-module circuit, and comparing the voltage values through a comparator; when the voltage value of the first capacitor in the upper sub-module circuit is greater than the voltage value of the second capacitor, outputting, by the comparator, 1, controlling a pulse signal $G_n$ of a switch tube $Q_n$ to be enabled, outputting a PWM signal with a duty cycle of 50%, when a pulse value is 1, turning on the switch tube, and when the pulse value is 0, turning off the switch tube; otherwise, outputting, by the comparator, 0, and the switch tube remaining off; when the voltage value of the first capacitor in the lower sub-module circuit is smaller than the voltage value of the second capacitor, outputting, by the comparator, 1, controlling the pulse signal $G_n$ of the switch tube $Q_n$ to be enabled, outputting the PWM signal with a duty cycle of 50%, when the pulse value is 1, turning on the switch tube, and when the pulse value is 0, turning off the switch tube; otherwise, outputting, by the comparator, 0, and the switch tube remaining off.

In an embodiment of the present invention, the comparator makes a judgment every time the control modules in the upper sub-module circuit and the lower sub-module circuit are separated by a switching period $T_s$.

Based on the foregoing technical solutions, the beneficial effects of the present invention compared with the prior art are as follows:

(1) The high step-down modular DC power supply provided in the present invention adopts standardized modules to cascade directly, including three cascading modes: upper module string cascading, lower module string cascading, and hybrid cascading of the upper module string and the lower module string. A quantity of cascading stages may be increased with the increase of the class of input voltage, and voltage-sharing may be achieved between input voltages of modules without communication and synchronization, which has an error less than 0.25%, and has strong scalability and high flexibility. A quantity of sub-modules may be increased or decreased according to specific application requirements, suitable for auxiliary power applications in medium-voltage or high-voltage DC input occasions.

(2) No communication and synchronization is needed between controllers of each sub-module unit in the present invention, and only internal capacitor voltages of modules need to be sampled, and compared through the comparator. If the comparator outputs 1, the pulse signal of the switch tube is controlled to be enabled, and the PWM signal with a duty cycle of 50% is output, when the pulse value is 1, the switch tube is turned on, and when the pulse value is 0, the switch tube is turned off; otherwise, the comparator outputs 0, and the switch tube remains off. Completely independent control can be achieved, and the circuit topology of each sub-module unit circuit is simple with a small quantity of switch tubes and low costs.

DETAILED DESCRIPTION OF EMBODIMENTS

In order to describe the present invention more specifically, the technical solutions of the present invention may be described in detail below with reference to the accompanying drawings and specific implementations. Technical features of various embodiments of the present invention may be combined correspondingly on the premise that there is no conflict with each other.

The high step-down modular DC power supply in the present invention includes an upper modular cascade circuit string, a lower modular cascade circuit string, a load, and an input source. The upper modular cascade circuit string includes i upper sub-module circuits, the lower modular cascade circuit string includes j lower sub-module circuits, and each upper sub-module circuit and each lower sub-module circuit includes a control module and a circuit module. The circuit module is a non-isolated three-port Buck-Boost circuit with the input and output capacitors in series, the control module only samples the capacitor voltage inside the upper/lower sub-module circuit, and the comparator judges whether the pulse signal with a duty cycle of 50% is enabled every other switching period $T_s$.

Figure 1:
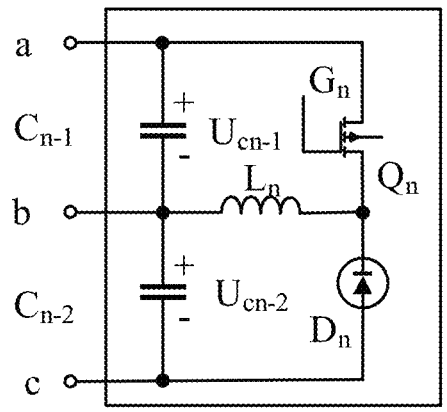
FIG. 1 is a circuit topology diagram of an upper sub-module according to an embodiment of the present invention.

The circuit topology of the upper sub-module is shown in FIG. 1. The upper sub-module circuit includes three upper output ports: a, b, and c, and a circuit connection mode is as follows: the first upper output port a, a positive side of the first capacitor $C_{n-1}$, and a drain of the first switch tube $Q_n$ are in common connection, the second upper output port b, a negative side of the first capacitor $C_{n-1}$, a positive side of the second capacitor $C_{n-2}$, and one end of the first inductor Ln are in common connection, the third upper output port c, a negative side of the second capacitor $C_{n-2}$, and an anode of the first diode $D_n$ are in common connection, and a source of the first switch tube $Q_n$, the other end of the first inductor Ln, and a cathode of the first diode $D_n$ are in common connection.

Figure 2:
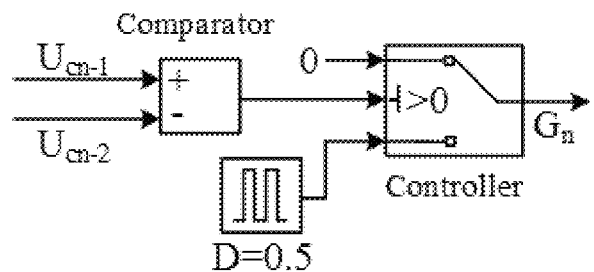
FIG. 2 is a control block diagram of a circuit of an upper sub-module according to an embodiment of the present invention.

The control block diagram of the upper sub-module is shown in FIG. 2. When the first capacitor voltage $U_{cn-1}$ is greater than the second capacitor voltage $U_{cn-2}$, the comparator outputs 1, and the PWM signal with a duty cycle of 50% output by a PWM power control chip can be transmitted to the first switch tube $Q_n$, that is, the pulse signal $G_n$ of the first switch tube $Q_n$ enables output of the PWM signal with a duty cycle of 50%, otherwise, the comparator outputs 0, the $G_n$ output signal is 0, and the first switch tube $Q_n$ remains off.

Figure 3:
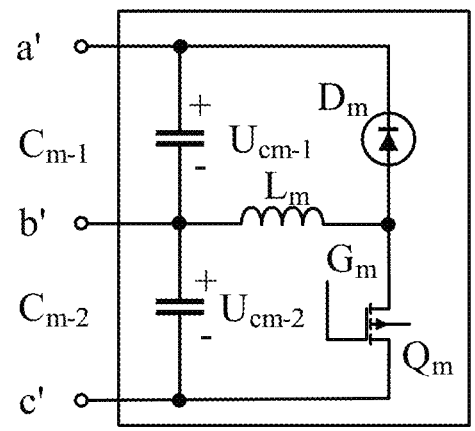
FIG. 3 is a circuit topology diagram of a lower sub-module according to an embodiment of the present invention.

The circuit topology of the lower sub-module is shown in FIG. 3. The lower sub-module circuit in the lower modular cascade circuit string is a non-isolated three-port Buck-Boost circuit with the input and output capacitors in series. Each lower sub-module circuit includes three lower output ports: a', b', and c', and a circuit connection mode is as follows: the first lower output port a', a positive side of the third capacitor $C_{m-1}$, and a cathode of the second diode $D_m$ are in common connection, the second lower output port b', a negative side of the third capacitor $C_{m-1}$, a positive side of the fourth capacitor $C_{m-2}$, and one end of the second inductor Lm are in common connection, the third lower output port c', a negative side of the fourth capacitor $C_{m-2}$, and a source of the second switch tube $Q_m$ are in common connection, and a drain of the second switch tube $Q_m$, the other end of the second inductor Lm, and an anode of the second diode $D_m$ are in common connection.

Figure 4:
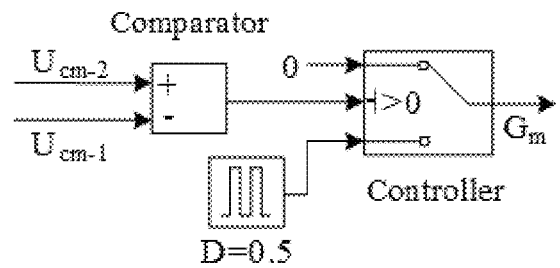
FIG. 4 is a control block diagram of a circuit of a lower sub-module according to an embodiment of the present invention.

The control block diagram of the lower sub-module is shown in FIG. 4. When the third capacitor voltage $U_{cm-1}$ is smaller than the fourth capacitor voltage $U_{cm-2}$, the comparator outputs 1, and the PWM signal with a duty cycle of 50% output by the PWM power control chip can be transmitted to the second switch tube $Q_m$, that is, the pulse signal $G_m$ of the second switch tube $Q_m$ enables output of the PWM signal with a duty cycle of 50%, otherwise, the comparator outputs 0, the Gm output signal is 0, and the second switch tube $Q_m$ remains off.

Figure 5:
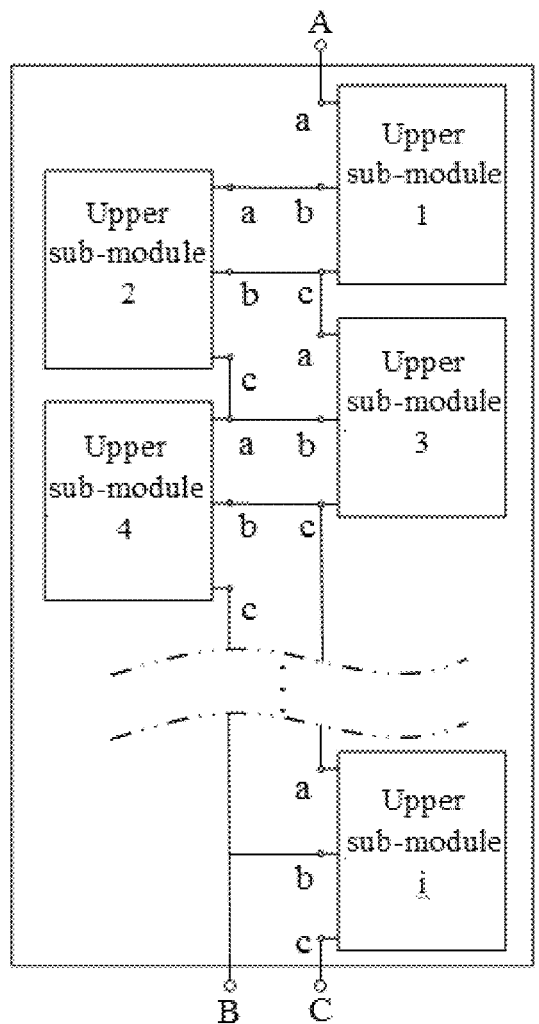
FIG. 5 is an internal connection diagram of an upper modular cascade string of a high step-down modular DC power supply according to an embodiment of the present invention.

In an embodiment of the present invention, a topology structure of the upper modular cascade circuit string is shown in FIG. 5. There are i upper sub-module circuits in FIG. 5, and i>4. In practical applications, i is a natural number greater than or equal to 2. A first upper output port a of a first upper sub-module circuit 1 is connected to a first upper port A of the upper modular cascade circuit string, a second upper output port b of the upper sub-module circuit 1 is connected to the first upper output port a of the upper sub-module circuit 2, and a third upper output port c of the upper sub-module circuit 1 is connected to the second upper output port b of the upper sub-modular circuit 2. A cascading mode of other upper sub-module circuits is: a second upper output port b of an upper sub-module circuit on a previous stage is connected to a first upper output port a of an upper sub-module circuit on an adjacent subsequent stage, and a third upper output port c of an upper sub-module circuit on a previous stage is connected to a second upper output port b of an upper sub-module circuit on an adjacent subsequent stage, where a second upper output port b of an $i^{th}$ upper sub-module circuit is connected to a second upper port B of the upper modular cascade circuit string, and the third upper output port c is connected to a third upper port C of the upper modular cascade circuit string.

Figure 6:
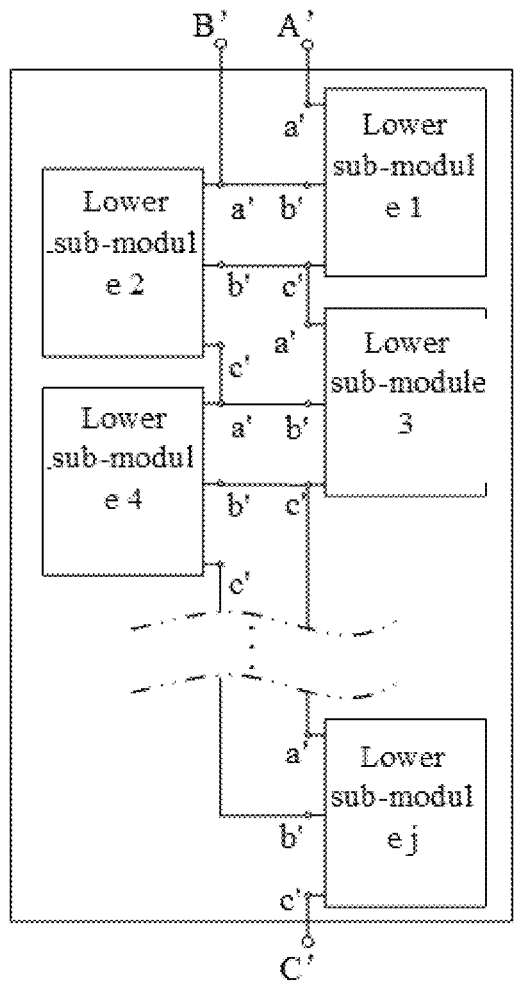
FIG. 6 is an internal connection diagram of a lower modular cascade string of a high step-down modular DC power supply according to an embodiment of the present invention.

In an embodiment of the present invention, a topology structure of the lower modular cascade circuit string is shown in FIG. 6. There are j lower sub-module circuits in FIG. 6, and j>4. In practical applications, j is a natural number greater than or equal to 2. A first lower output port a' of a first lower sub-module circuit 1 is connected to a first lower port A' of the lower modular cascade circuit string, a second lower output port b' of the lower sub-module circuit 1 is connected to the second lower port B' of the lower modular cascade circuit string and a first lower output port a' of the lower sub-modular circuit 2, and the third lower output port c' of the lower sub-module circuit 1 is connected to the second lower output port b' of the lower sub-modular circuit 2. A cascading mode of other lower sub-module circuits is: a second lower output port b' of a lower sub-module circuit on a previous stage is connected to a first lower output port a' of a lower sub-module circuit on an adjacent subsequent stage, and a third lower output port c' of a lower sub-module circuit on a previous stage is connected to a second lower output port b' of a lower sub-module circuit on an adjacent subsequent stage, where a third lower output port c' of the $j^{th}$ lower sub-module circuit is simultaneously connected to a third lower port C' of the lower modular cascade circuit string.

A connection mode of the upper modular cascade circuit string, the lower modular cascade circuit string, the load, and the input source in the high step-down modular DC power supply is as follows: a first upper port A of the upper modular cascade circuit string is connected to a positive side of the input source, a third lower port C' of the lower modular cascade circuit string is connected to a negative side of the input source, a second upper port B of the upper modular cascade circuit string and the first lower port A' of the lower modular cascade circuit string are in common connection with a positive side of the load, and the third upper port C of the upper modular cascade circuit string and a second lower port B' of the lower modular cascade circuit string are in common connection with a negative side of the load. There are three types of cascading modes between power supply module strings: upper module string cascading, lower module string cascading, and hybrid cascading of the upper module string and the lower module string.

In a specific implementation of the present invention, when the upper module string cascading is adopted in the power supply, a quantity of upper sub-modules in cascade connection is i≥2, and a quantity of lower sub-modules in cascade connection is j=0; when the lower module string cascading is adopted in the power supply, the quantity of lower sub-modules in cascade connection is j≥2, and the quantity of upper sub-modules in cascade connection is i=0; and when the hybrid cascading of the upper module string and the lower module string is adopted in the power supply, i≥2 and j≥2. In an embodiment, the hybrid cascading of the upper module string and the lower module string is adopted in the power supply, and a quantity of the upper and lower sub-modules in cascade connection is i=j and i≥2 and j≥2.

The switch tube used in the sub-module of the power supply may be a full-controlled power semiconductor device Metal-Oxide-Semiconductor Field-Effect Transistor (MOSFET) or Insulated Gate Bipolar Transistor (IGBT).

Figure 7:
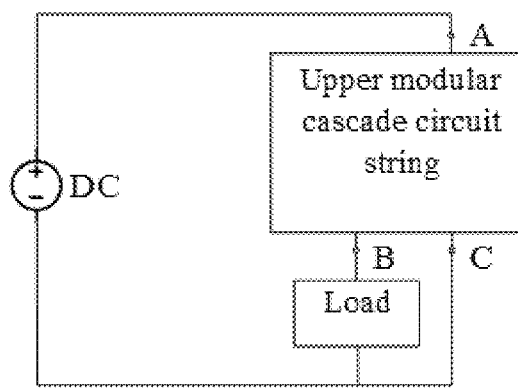
FIG. 7 is one of three typical system connection diagrams of a high step-down modular DC power supply according to an embodiment of the present invention.
Figure 8:
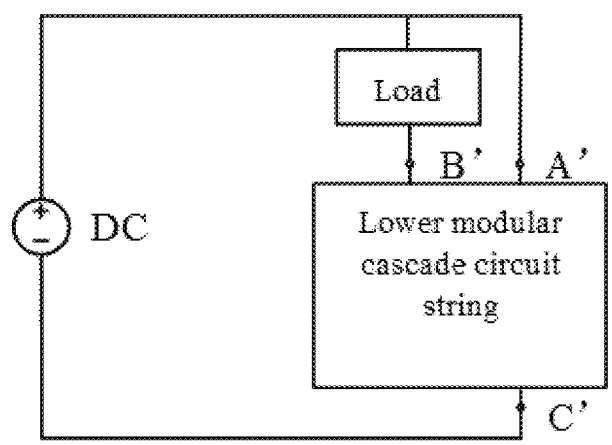
FIG. 8 is one of three typical system connection diagrams of a high step-down modular DC power supply according to an embodiment of the present invention.
Figure 9:
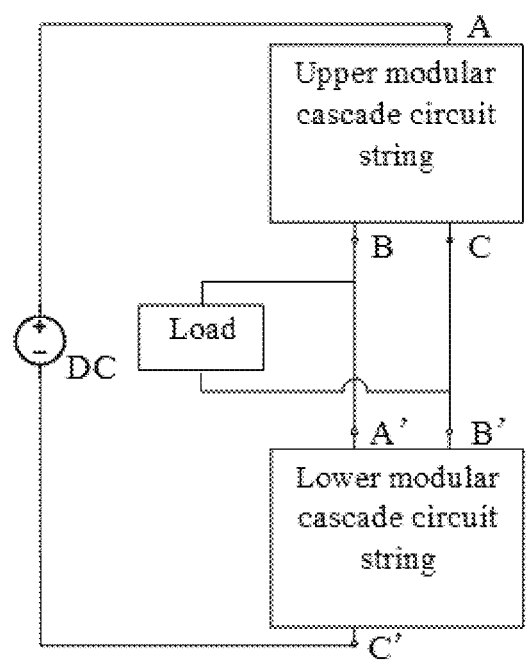
FIG. 9 is one of three typical system connection diagrams of a high step-down modular DC power supply according to an embodiment of the present invention.
Figure 10A:
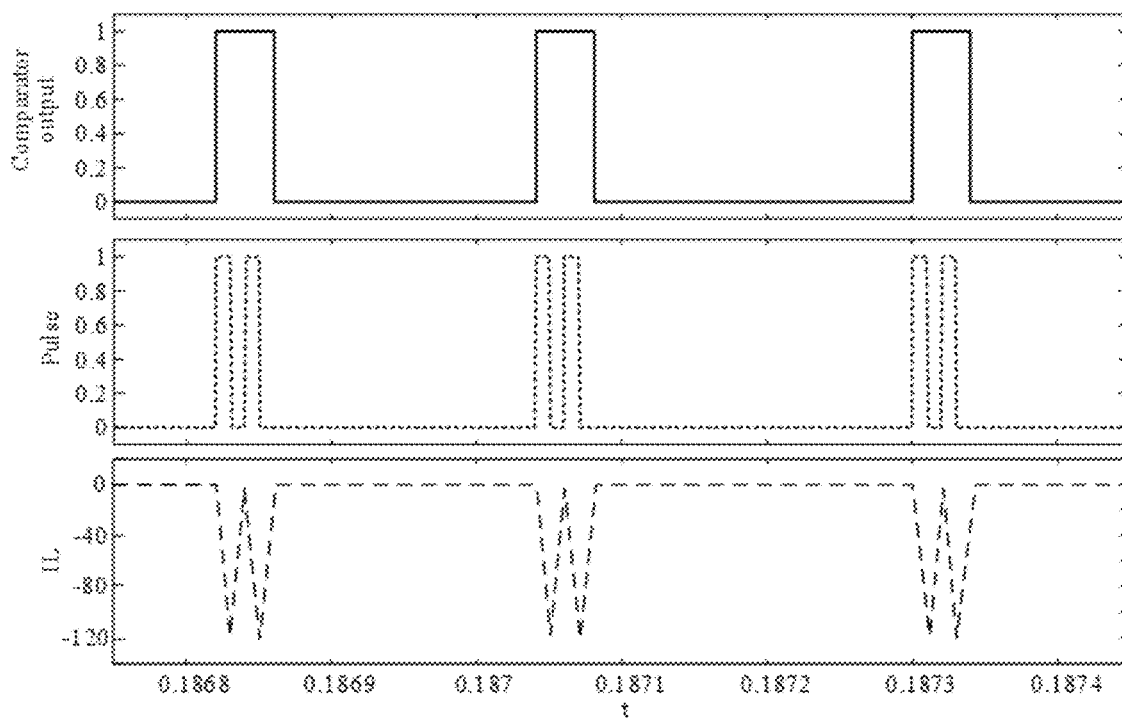
FIG. 10A-FIG. 10D are examples of a high step-down modular DC power supply according to an embodiment of the present invention, showing comparator output, a pulse signal, and an instantaneous value waveform of inductor current in each sub-module in FIG. 9.
Figure 10B:
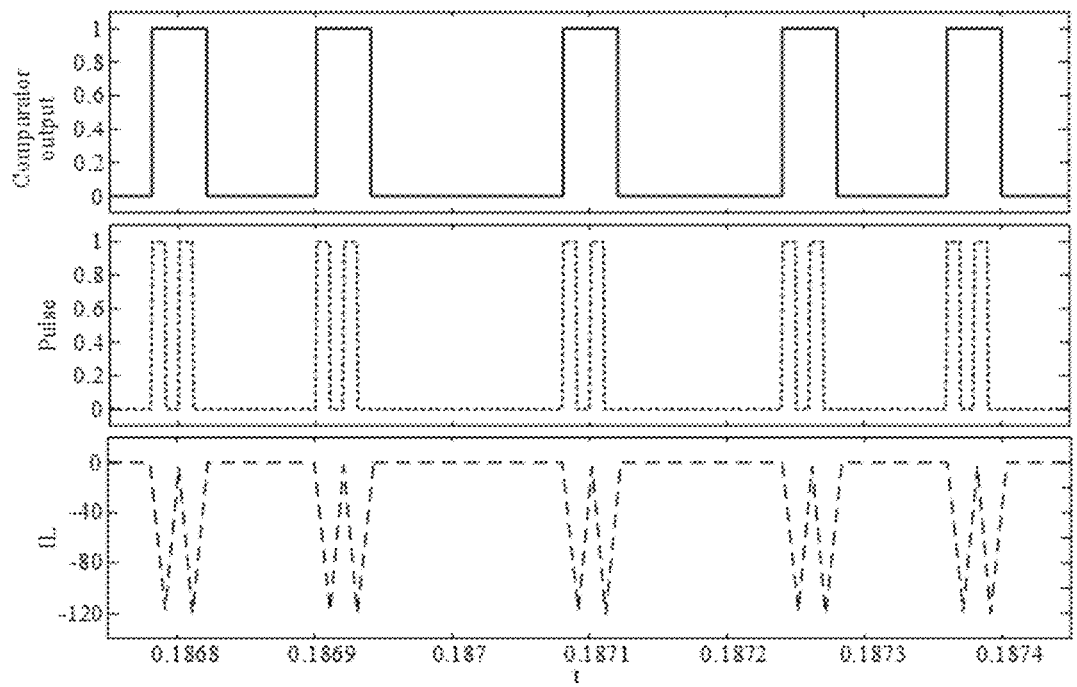
Figure 10C:
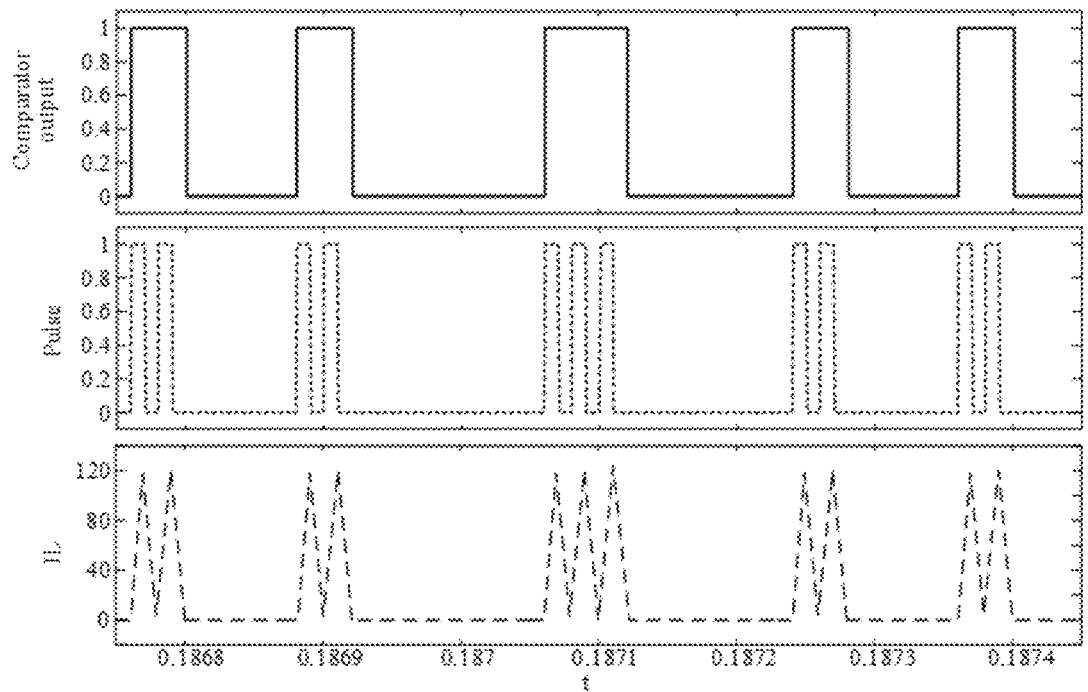
Figure 10D:
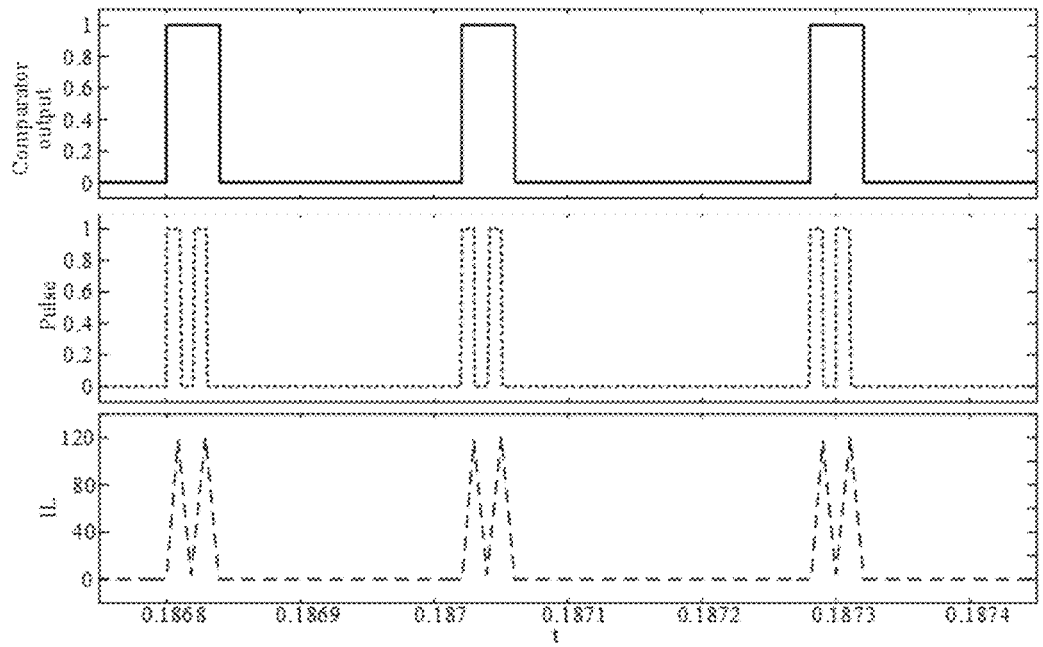

FIG. 7, FIG. 8, and FIG. 9 are three typical system connection diagrams of the power supply. For example, if a quantity of sub-module circuits is 4, when the upper module string cascading is adopted in the power supply, a system connection diagram thereof is shown in FIG. 7, where i=4, and j=0. When the lower module string cascading is adopted in the power supply, a system connection diagram thereof is shown in FIG. 8, where i=0, and j=4. When the hybrid cascading of the upper module string and the lower module string is adopted in the power supply, a system connection diagram thereof is shown in FIG. 9, where i=j=2.

Each upper/lower sub-module circuit of the power supply includes an independent control module, and an internal controller of each upper/lower sub-module circuit only samples an internal capacitor voltage of the upper/lower sub-module.

A control solution of the control module in the upper sub-module circuit is as follows: when an upper capacitor voltage $U_{cn-1}$ is greater than a lower capacitor voltage $U_{cn-2}$, the comparator outputs 1, and at this time, the pulse signal $G_n$ used to control the first switch tube $Q_n$ is enabled, and the PWM signal with a duty cycle of 50% is output. Otherwise, the comparator outputs 0, the $G_n$ output signal is 0, and the first switch tube $Q_n$ remains off.

A control solution of the control module in the lower sub-module circuit is as follows: when an upper capacitor voltage $U_{cm-1}$ is smaller than a lower capacitor voltage $U_{cm-2}$, the comparator outputs 1, and at this time, the pulse signal $G_m$ used to control the second switch tube $Q_m$ is enabled, and the PWM signal with a duty cycle of 50% is output. Otherwise, the comparator outputs 0, the $G_m$ output signal is 0, and the second switch tube $Q_m$ remains off.

In the present invention, the DC power supply in which the hybrid cascading of the upper module string and the lower module string is adopted and i=j=2 is a specific application example. The topology is shown in FIG. 9, a DC voltage on the input side is 10 KV, and the circuit under this condition is simulated and verified. The upper modular cascade circuit string includes an upper sub-module circuit 1 and an upper sub-module circuit 2, and the lower modular cascade circuit string includes a lower sub-module circuit 1 and a lower sub-module circuit 2. FIG. 10A-FIG. 10D respectively show an instantaneous value of the inductor current, a driving signal of the switch tube, and an output value of the comparator in the control module of the upper sub-module circuit 1, the upper sub-module circuit 2, the lower sub-module circuit 1, and the lower sub-module circuit 2 for a specific period of time. The black solid line is the output value of the comparator, the black dotted line is the pulse signal waveform, and the black dotted line is the instantaneous value of the inductor current. It may be seen from FIG. 10A-FIG. 10D that the control module in each sub-module operate independently to realize control of the switch tube. When the output value of the comparator is 1, the pulse signal is the PWM signal with a duty cycle of 50%, and the inductor has a current flow, and when the pulse value is 1, the switch tube is turned on, when the pulse value is 0, the switch tube is off; and when the output value of the comparator is 0, the pulse signal is 0, the inductor has no current flow, and the switch tube is off. Through simple comparator output control, there is no need for communication and synchronization between controllers of each sub-module unit, and completely independent control may be achieved.

Figure 11:
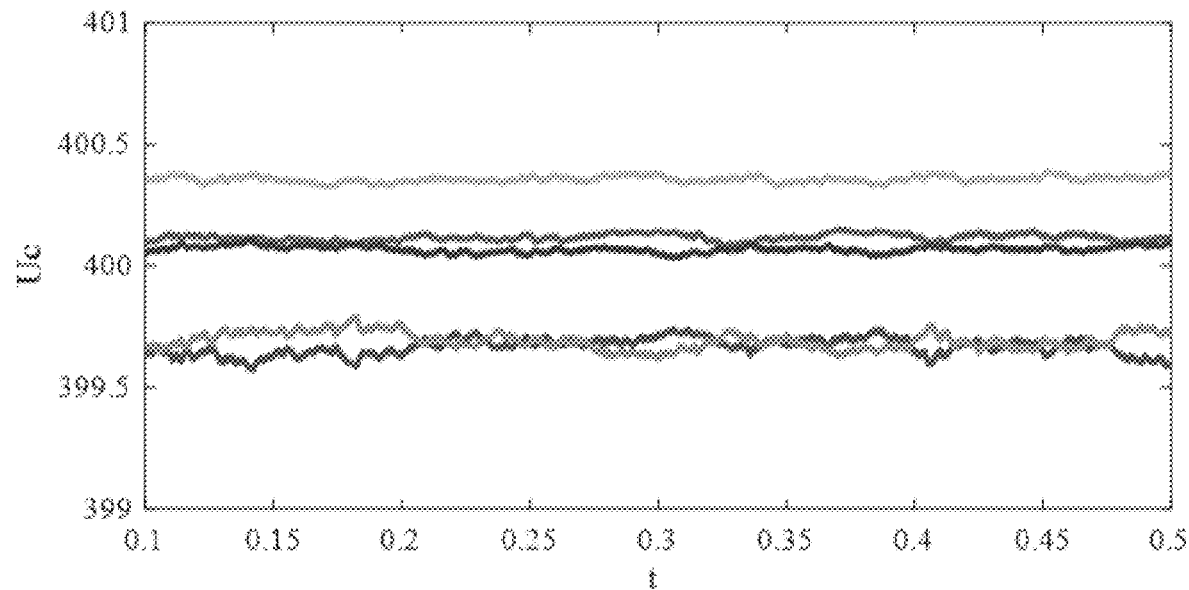
FIG. 11 is an example of a high step-down modular DC power supply according to an embodiment of the present invention, showing voltage waveforms of each capacitor in FIG. 9.
Figure 12:
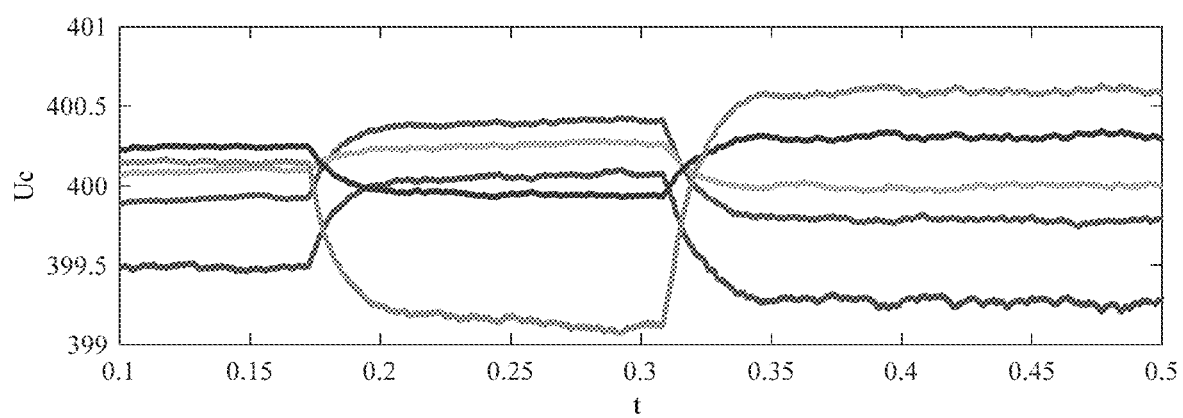
FIG. 12 is an example of a high step-down modular DC power supply according to an embodiment of the present invention, showing voltage waveforms of each capacitor in FIG. 7.

When the load changes, voltage equalization of power supply input series capacitors can still be ensured. The power supply topology is shown in FIG. 9 and i=j=2. FIG. 11 shows a voltage value of the power supply input series capacitor during a load change process when the DC voltage on the input side is 2000V. When t=[0.1 s 0.15 s], a load resistance is 200, when t=[0.15 s 0.235 s], the load resistance is reduced to 100, when t=[0.235 s 0.326 s], the load resistance is reduced to 50, and when t=[0.326 s 0.5 s], the load resistance returns to 200. It may be seen from FIG. 11 that even when the load changes, the voltage of the power supply input series capacitor is evenly divided and constant at about 400V, which accords with a theoretical calculation value and an error is less than 0.15%. The power supply topology is shown in FIG. 7 and i=4, j=0. FIG. 12 shows a voltage value of the power supply input series capacitor during a load change process when the DC voltage on the input side is 2000V. When t=[0.1 s 0.1725 s], the load resistance is 100, when t=[0.1725 s 0.308 s], the load resistance is reduced to 50, and when t=[0.308 s 0.5 s], the load resistance is 200. It may be seen from FIG. 12 that even when the load changes, the voltage of the power supply input series capacitor is evenly divided and constant at about 400V, which accords with a theoretical calculation value and an error is less than 0.25%. The power supply has strong expansibility and high flexibility. According to specific application requirements, a quantity of sub-modules may be increased, thereby changing the capacitor voltage value.

The foregoing description of the embodiments is for the convenience of those of ordinary skill in the art to understand and apply the present invention. It is obvious to those skilled in the art that various modifications to the foregoing embodiments may be readily made, and the general principles described herein may be applied to other embodiments without creative effort. Therefore, the present invention is not limited to the foregoing embodiments, and improvements and modifications made to the present invention by those skilled in the art according to the disclosure of the present invention should all fall within the protection scope of the present invention.

What is claimed is:

1. A high step-down modular DC power supply, comprising an input source, a load, an upper modular cascade circuit string comprising i upper sub-module circuits, and/or a lower modular cascade circuit string comprising j lower sub-module circuits; wherein
   the upper sub-module circuit comprises a first capacitor, a second capacitor, a first inductor, a first switch tube, a first diode, and three upper output ports; and a first upper output port of the upper sub-module circuit, a positive side of the first capacitor, and a drain of the first switch tube are in common connection, a second upper output port of the upper sub-module circuit, a negative side of the first capacitor, a positive side of the second capacitor, and one end of the first inductor are in common connection, a third upper output port of the upper sub-module circuit, a negative side of the second capacitor, and an anode of the first diode are in common connection, and a source of the first switch tube, the other end of the first inductor, and a cathode of the first diode are in common connection;
   the lower sub-module circuit comprises a third capacitor, a fourth capacitor, a second inductor, a second switch tube, a second diode, and three lower output ports; and a first lower output port of the lower sub-module circuit, a positive side of the third capacitor, and a cathode of the second diode are in common connection, a second lower output port of the lower sub-module circuit, a negative side of the third capacitor, a positive side of the fourth capacitor, and one end of the second inductor are in common connection, a third lower output port of the lower sub-module circuit, a negative side of the fourth capacitor, and a source of the second switch tube are in common connection, and a drain of the second switch tube, the other end of the second inductor, and an anode of the second diode are in common connection;
   the upper modular cascade circuit string comprises three upper ports, a first upper port is connected to a first upper output port of a first upper sub-module circuit, a second upper port is connected to a second upper output port of an $i^{th}$ upper sub-module circuit, and a third upper port is connected to a third upper output port of the $i^{th}$ upper sub-module circuit; and an internal cascading mode of the i upper sub-module circuits is as follows: a second upper output port of an upper sub-module circuit on a previous stage is connected to a first upper output port of an upper sub-module circuit on an adjacent subsequent stage, and a third upper output port of an upper sub-module circuit on a previous stage is connected to a second upper output port of an upper sub-module circuit on an adjacent subsequent stage, wherein i is a natural number;
   the lower modular cascade circuit string comprises three lower ports, a first lower port is connected to a first lower output port of a first lower sub-module circuit, a second lower port is connected to a first lower output port of a second lower sub-module circuit, and a third lower port is connected to a third lower output port of a $j^{th}$ lower sub-module circuit; and an internal cascading mode of the j lower sub-module circuits is as follows: a second lower output port of a lower sub-module circuit on a previous stage is connected to a first lower output port of a lower sub-module circuit on an adjacent subsequent stage, and a third lower output port of a lower sub-module circuit on a previous stage is connected to a second lower output port of a lower sub-module circuit on an adjacent subsequent stage, wherein j is a natural number;
   when 2≤i and 2≤j, the first upper port of the upper modular cascade circuit string is connected to a positive side of the input source, the third lower port of the lower modular cascade circuit string is connected to a negative side of the input source, the second upper port of the upper modular cascade circuit string and the first lower port of the lower modular cascade circuit string are in common connection with a positive side of the load, and the third upper port of the upper modular cascade circuit string and the second lower port of the lower modular cascade circuit string are in common connection with a negative side of the load;

when j=0 and 2≤i, the first upper port of the upper modular cascade circuit string is connected to the positive side of the input source, the second upper port of the upper modular cascade circuit string is connected to the positive side of the load, and the third upper port of the upper modular cascade circuit string and the negative side of the load are in common connection with the negative side of the input source; and when i=0 and 2≤j, the third lower port of the lower modular cascade circuit string is connected to the negative side of the input source, the second lower port of the lower modular cascade circuit string is connected to the negative side of the load, and the first lower port of the lower modular cascade circuit string and the positive side of the load are in common connection with the positive side of the input source.

2. The high step-down modular DC power supply according to claim 1, wherein both the upper sub-module circuit and the lower sub-module circuit comprise a control module for controlling turn-on or turn-off of the switch tube.

3. The high step-down modular DC power supply according to claim 1, wherein i=j and i≥2, j≥2.

4. The high step-down modular DC power supply according to claim 1, wherein the switch tube is a full-controlled power semiconductor device.

\* \* \* \* \*